US009938452B2

(12) United States Patent
Barron et al.

(10) Patent No.: US 9,938,452 B2
(45) Date of Patent: Apr. 10, 2018

(54) IMMOBILE PROPPANTS

(71) Applicant: Halliburton Energy Services, Inc., Houston, TX (US)

(72) Inventors: Andrew R. Barron, Houston, TX (US); Christopher E. Coker, Houston, TX (US); Steven Florio, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 62 days.

(21) Appl. No.: 14/437,196

(22) PCT Filed: Oct. 18, 2013

(86) PCT No.: PCT/US2013/065550
§ 371 (c)(1),
(2) Date: Apr. 21, 2015

(87) PCT Pub. No.: WO2014/066144
PCT Pub. Date: May 1, 2014

(65) Prior Publication Data
US 2015/0284626 A1    Oct. 8, 2015

Related U.S. Application Data

(60) Provisional application No. 61/794,433, filed on Mar. 15, 2013, provisional application No. 61/717,915, filed on Oct. 24, 2012.

(51) Int. Cl.
*E21B 43/267* (2006.01)
*C09K 8/80* (2006.01)
*C09K 8/62* (2006.01)

(52) U.S. Cl.
CPC ............. *C09K 8/80* (2013.01); *C09K 8/62* (2013.01); *C09K 8/805* (2013.01); *E21B 43/267* (2013.01)

(58) Field of Classification Search
CPC .. C09K 8/80; C09K 8/805; C09K 8/62; E21B 43/267
(Continued)

(56) References Cited

U.S. PATENT DOCUMENTS 5,595,245 A * 1/1997 Scott, III ............... E21B 27/02
166/250.1
5,944,124 A * 8/1999 Pomerleau ............ E21B 17/00
138/109
(Continued)

FOREIGN PATENT DOCUMENTS

EP    0834644 A2    4/1998

OTHER PUBLICATIONS

International Search Report and Written Opinion of the International Searching Authority issued in corresponding International Patent Application No. PCT/US2013/065550 dated Mar. 26, 2014 (19 pages).

*Primary Examiner* — Silvana C Runyan
(74) *Attorney, Agent, or Firm* — Craig W. Roddy; Tumey L.L.P.

(57) ABSTRACT

The present invention relates to a plurality of proppants, wherein at least a portion of the proppants are immobile proppants and are immobile in a proppant pack. The proppants, pre-aggregated proppants, immobile proppants, or any combination thereof can be used for fracking of a well for hydrocarbon recovery. A method of producing, immobilizing, localizing, or any combination thereof a plurality of proppants is provided by the present invention. The present invention also provides a method of immobilizing proppants including flowing a plurality of proppants into a subterranean location, and fusing the plurality of proppants to each other, to a subterranean surface, or a combination thereof to immobilize the plurality of proppants. The fusing can be accomplished using a chemical reaction, physical interac- (Continued)

tion, cross-linking, polymerization, microwave sintering, surface diffusion, magnetism, colloid destabilization, mechanical entanglement, interlocking, in-situ dimpling, or any combination thereof.

21 Claims, 5 Drawing Sheets

(58) Field of Classification Search
USPC .................. 166/280.1, 305.1, 308.1, 300
See application file for complete search history.

(56) References Cited

U.S. PATENT DOCUMENTS

| | | | | |
|---|---|---|---|---|
| 6,059,034 A * | 5/2000 | Rickards | ............... | C09K 8/805 166/280.2 |
| 6,528,157 B1 * | 3/2003 | Hussain | ............... | C09K 8/805 428/325 |
| 8,006,759 B1 | 8/2011 | Cochran, Jr. | ......... | E21B 43/267 166/280.2 |
| 2002/0169085 A1 * | 11/2002 | Miller | ............... | C09K 8/685 507/200 |
| 2003/0060374 A1 * | 3/2003 | Cooke, Jr. | ............... | C09K 8/62 507/200 |
| 2003/0062160 A1 | 4/2003 | Boney et al. | | |
| 2003/0148893 A1 * | 8/2003 | Lunghofer | ............... | C04B 33/04 507/200 |
| 2003/0181320 A1 * | 9/2003 | Rose | ............... | B01D 67/0048 502/170 |
| 2005/0145384 A1 * | 7/2005 | Jasser | ............... | E21B 17/1007 166/278 |
| 2005/0274510 A1 | 12/2005 | Nguyen et al. | | |
| 2006/0113077 A1 | 6/2006 | Willberg et al. | | |
| 2007/0277978 A1 * | 12/2007 | Reddy | ............... | C09K 8/5086 166/276 |
| 2008/0110621 A1 | 5/2008 | Montgomery et al. | | |
| 2008/0196897 A1 | 8/2008 | Nguyen | | |
| 2009/0044945 A1 | 2/2009 | Willberg et al. | | |
| 2009/0065209 A1 * | 3/2009 | Huang | ............... | C09K 8/68 166/281 |
| 2009/0288820 A1 * | 11/2009 | Barron | ............... | B01J 13/02 166/249 |
| 2010/0212897 A1 * | 8/2010 | Nguyen | ............... | E21B 43/267 166/280.1 |
| 2011/0146985 A1 * | 6/2011 | Xie | ............... | C03C 10/0045 166/280.2 |
| 2011/0192592 A1 * | 8/2011 | Roddy | ............... | E21B 47/01 166/250.01 |

* cited by examiner

IMMOBILE PROPPANTS

This application is a National Stage Application of PCT/US2013/065550, filed Oct. 18, 2013, which claims the benefit under 35 U.S.C. § 119(e) of prior U.S. Provisional Patent Application No. 61/717,915, filed Oct. 24, 2012 and U.S. Provisional Patent Application No. 61/794,433, filed Mar. 15, 2013, which are incorporated in their entirety by reference herein.

BACKGROUND OF THE INVENTION

The present invention relates to proppants and methods to make and use the same. More specifically, the present invention relates to immobile proppants, which have the ability to be placed into a well formation and/or a fracture and then become substantially or fully immobile at a desired location in the formation and/or fracture.

One issue facing fracking with proppants is that the proppants can be injected into a well to promote or sustain fracturing sites, but at times, the proppant can be too mobile. In other words, the proppant can unintentionally move or shift from its desired location in the well formation or fracture, thus diminishing or defeating the purpose of the proppant. While some attempts to address this problem have involved using elongated shapes or other specific non-spherical or non-fibrous materials. However, few, if any, of these attempts have yielded success. While proposed designs may have appeared encouraging, from a practical standpoint they did not work as hoped. The proppant did not remain substantially immobile when needed, and/or the injection of the proppant into the well was difficult or not at all successful. Accordingly, there is a need in the proppant industry to provide proppants that can become immobile at a desired location, but can also be injected or otherwise introduced into a formation or fracture with the same ease as conventional spherical proppants.

SUMMARY OF THE PRESENT INVENTION

It is therefore a feature of the present invention to provide proppants, pre-aggregated, and immobile proppants that can be effectively locked into a desired subterranean location.

Another feature of the present invention is to provide methods of pre-aggregating and immobilizing proppants above ground, in a subterranean location, or both.

A further feature of the present invention is to enable more efficient removal of hydrocarbons from subterranean locations by immobilizing proppants.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a plurality of proppants, wherein at least a portion of the proppants are immobile proppants and are immobile in a proppant pack. The proppants, pre-aggregated proppants, immobile proppants, or any combination thereof can include fused proppants as twins, triplets, quartets, quintets, sextets, septets, octets, higher-order linked proppants, or any combination thereof.

The proppants, pre-aggregated proppants, and immobile proppants of the present invention can be used for fracking of a well for hydrocarbon recovery. A method of producing, immobilizing, localizing, or any combination thereof a plurality of proppants is also provided by the present invention. The present invention further provides a method of immobilizing proppants including flowing a plurality of proppants into a subterranean location, and fusing the plurality of proppants to each other, to a subterranean surface, or a combination thereof to immobilize the plurality of proppants. The subterranean location can include a fracture, a hydrocarbon-bearing formation, a hole, a well bore, or any combination thereof. The subterranean surface can include, for example, a conduit positioned in a well bore. The fusing can be accomplished using a chemical reaction, physical interaction, cross-linking, polymerization, microwave sintering, surface diffusion, magnetism, colloid destabilization, mechanical entanglement, interlocking, in-situ dimpling, or any combination thereof. At least a portion of the plurality of proppants can be aggregated prior to flowing into the subterranean location. The method can further include extracting at least one hydrocarbon from the subterranean location.

Proppants, pre-aggregated proppants, immobile proppants, or any combination thereof as described herein are provided by the present invention. Methods of producing proppant, pre-aggregated proppants, immobile proppants, or any combination thereof as described herein are also provided by the present invention. Methods of localizing, immobilizing, pre-aggregating, or any combination thereof proppants in a subterranean formation as described herein are also provided by the present invention.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

DETAILED DESCRIPTION OF THE PRESENT INVENTION

Figure 1:
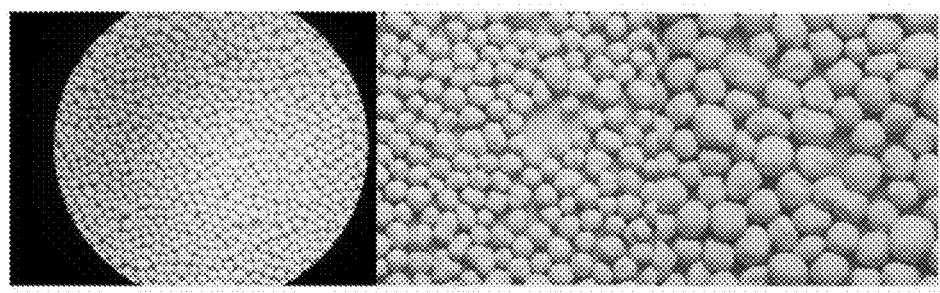
FIG. 1 provides an example of various shapes that can be used to achieve immobilized proppants in accordance with the teachings of the present invention.

The present invention provides a plurality of proppants, wherein at least a portion of the proppants are immobile proppants and are immobile in a proppant pack. With this invention and for any of the techniques used, for a plurality of proppants, all or a portion thereof can be fused or otherwise attached to one or more other proppants. For instance, a batch of proppant can be injected or otherwise introduced into a subterranean location such as a hydrocarbon-bearing formation, and this batch can be 100% (by weight) of fused or attached proppants, or can be from about 1.0% by weight to about 100% by weight of fused or attached proppants, with the remaining amount being non-fused or non-attached proppants. This weight % of fused/attached proppants can be from about 5.0 wt % to about 95 wt %, from about 15 wt % to about 90 wt %, from about 25 wt % to about 80 wt %, from about 35 wt % to about 75 wt %, from about 50 wt % to about 70 wt % and any other weight percent within one of these ranges, and with the remaining weight percent being non-fused/non-attached proppants.

The proppants of the present invention can be made entangled together or connected together (groups of two proppants connected together, groups of 2 to 3 proppants connected together, or groups of 3 or more proppants connected together, or a matrix of connected proppants that can define the entire proppant pack or a portion thereof) or can be formed in situ at the formation or fracture. In general, for all proppants of the present invention, the intention of this is to ensure that the proppant is not flushed away from the annulus during subsequent high water rate injection.

The proppant can have any particle size. For instance, the proppant can have a particle diameter size of from about 75 microns to about 1.0 cm or a diameter of from about 100 microns to about 2 mm, or a diameter of from about 100 microns to about 3,000 microns, or a diameter of from about 100 microns to about 1,000 microns. Other particle sizes can be used. Further, the particle sizes as measured by their diameter can be above the numerical ranges provided herein or below the numerical ranges provided herein. The proppant can have any median particle size, such as a median particle size, dp50, of from about 90 µm to about 2000 µm (e.g., from 90 µm to about 2,000 µm, from about 100 µm to about 2000 µm, from about 200 µm to about 2000 µm, from about 300 µm to about 2000 µm, from about 500 µm to about 2,000 µm, from about 750 µm to about 2,000 µm, from about 100 µm to about 1,000 µm, from about 100 µm to about 750 µm, from about 100 µm to about 500 µm, from about 100 µm to about 250 µm, from about 250 µm to about 2000 µm, from about 250 µm to about 1000 µm), wherein dp50 is a median particle size where 50% of the particles of the distribution have a smaller particle size.

The proppants of the present application can, for instance, have a specific gravity of from about 0.6 g/cc to about 4 g/cc. The specific gravity can be from about 1.0 g/cc to about 3 g/cc or can be from about 0.9 g/cc to about 2.5 g/cc, or can be from about 1.0 g/cc to 2.5 g/cc, or from about 1.0 g/cc to about 2.4 g/cc, or from about 1.0 g/cc to about 2.3 g/cc, or from about 1.0 g/cc to about 2.2 g/cc, or from about 1.0 g/cc to about 2.1 g/cc, or from about 1.0 g/cc to about 2.0 g/cc. Other specific gravities above and below these ranges can be obtained. The term "specific gravity" as used herein is the weight in grams per cubic centimeter (g/cc) of volume, excluding open porosity in determining the volume. The specific gravity value can be determined by any suitable method known in the art, such as by liquid (e.g., water or alcohol) displacement or with a gas pycnometer.

The fusion and/or entangling of proppants can be achieved by placing a coating on all or a portion of the proppants injected or otherwise introduced into the formation. This coating can be a chemical coating, such as monomeric or polymeric. This coating can be one that can be cured, can be a thermoset, or can be thermoplastic. The coating that permits attaching of two or more proppants together can be placed on the proppants after they are formed, and prior to the proppants being introduced into the formation. The coating can be part of the solution used to form the slurry that is used to transport the proppants down the well and into the formation. The coating can be such that it permits connecting or attaching of proppants after a certain amount of time, or can be activated by temperature, such as by heat, or can be activated by curing techniques, such as IR, UV, or by contacting the coating with an activator or crosslinker, and the like.

The immobile proppants can be immobilized by chemical reaction between adjacent proppants. The chemical reaction can include cross-linking. In the present invention, the proppants or a portion thereof can react with adjacent proppants to become immobile. For instance, the proppants can cross-link with each other or otherwise connect with each other through a chemical interaction or reaction. With any of the proppants of the present invention, the permeability or porosity of the proppant pack can be the same or substantially the same (within 25%, within 15%, within 10%, within 5.0%, or within 1.0%) as the same proppant that is not connected together, such as by cross-linking or other treatments.

Figure 2:
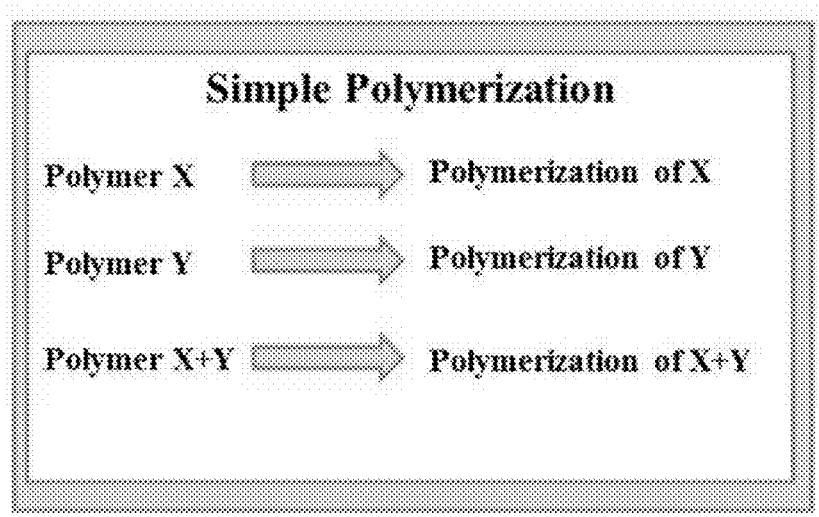
FIG. 2 shows cross-linking of proppants through polymerization in accordance with the teachings of the present invention.
Figure 2:
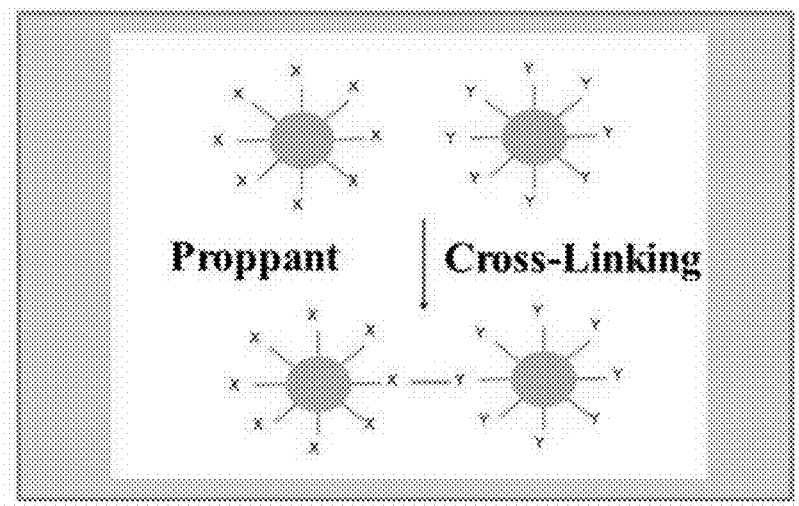

The proppants or a portion thereof can have at least the surface (or portion thereof) chemically functionalized to form chemically functionalized proppants. A portion (such as an equal or almost equal weight portion) of the chemically functionalized proppants can have a functional type X and the other portion of chemically functionalized proppants can have a functional type Y, wherein functional type X and functional type Y are capable of reacting with each other under downhole conditions to form a linkage between X and Y, for instance as shown in FIG. 2. The functional type X can be a chemical group X and functional type Y can be a chemical group Y, wherein each can be considered linkage groups. The reaction of the X and Y groups can be by way of a de-esterification reaction or charge manipulation. An alternative approach involves charged surfaces that will be linked by their charge or the presence of salts down-hole. The reaction of the X and Y groups can be by a cross-linking reaction. The reaction of the X and Y groups can form a covalent bond between the X and Y groups. The cross-linking, if used, can occur by simply combining the two proppant types together, or can be initiated with a chain initiator, a cross-linker, and/or by heat, and the like. If a chain initiator or cross-linker is used, this can be introduced with the proppants or before or after proppant introduction into the well. The two proppant types can be introduced as a mixture, or sequentially, or at the same time or about the same time by two simultaneous injections of each proppant type.

The proppant that receives the chemical group X and chemical group Y can be a ceramic proppant or can be or include alumina, silica, and/or other minerals and metal oxides, and which allows subsequent reactivity as described herein. For instance, the techniques described in the following references can be adapted to this invention: "Inorganic-organic hybrid and Composite Materials Using Carboxylate-Alumoxanes," Vogelson, et al., 9th CIMTEC—World Ceramics Congress, Ceramics Getting into the 2000—Part C, 1999, 499; "Inorganic-Organic Hybrid and Composite Resin Materials Using Carboxylate-Alumoxanes as Functionalized Cross-Linking Agents," Vogelson, et al., Chem.

Mater., 2000, 12, 795-804; and "Molecular Coupling Layers Formed by Reactions of Epoxy Resins with Self-Assembled Carboxylate Monolayers Grown on the Native Oxide of Aluminum," Vogelson, et al., J. Mater. Chem., 2003, 13, 291-296; which are incorporated by reference herein in their entireties.

For purposes of the present invention, a ceramic proppant is a proppant that contains at least 90% by weight ceramic materials based on the entire weight of the ceramic proppant. For example, the ceramic proppant can contain at least 92% by weight ceramic materials, at least 95% by weight ceramic materials, at least 96% by weight ceramic materials, at least 97% by weight ceramic materials, at least 98% by weight ceramic materials, at least 99% by weight ceramic materials, at least 99.5% by weight ceramic materials, at least 99.9% by weight ceramic materials, or can be 100% by weight ceramic materials. The ceramic materials, for purposes of the present invention, can be one or more metal oxides, and/or one or more non-oxides that are considered ceramics, such as carbides, borides, nitrides, and/or silicides. For purposes of the present invention, the term "ceramic" includes glass material, ceramic material, and/or glass-ceramic material and/or can comprise one or more glass, ceramic, and/or glass-ceramic phases. The "ceramic" material can be non-crystalline, crystalline, and/or partially crystalline.

The ceramic in the ceramic proppants of the present invention can be an oxide, such as aluminum oxides (alumina) and/or mixed metal aluminum oxides, such as metal aluminates containing calcium, yttrium, titanium, lanthanum, barium, and/or silicon in addition to aluminum. The ceramic can be an oxide, such as aluminum oxide called alumina, or a mixed metal oxide of aluminum called an aluminate, a silicate, or an aluminosilicate, such as mullite or cordierite. The aluminate or the ceramic in general may contain magnesium, calcium, yttrium, titanium, lanthanum, barium, and/or silicon. The ceramic may be formed from a nanoparticle precursor such as an alumoxane. Alumoxanes can be chemically functionalized aluminum oxide nanoparticles with surface groups including those derived from carboxylic acids such as acetate, methoxyacetate, methoxyethoxyacetate, methoxyethoxyethoxyacetate, lysine, and stearate, and the like. The ceramic can include, but is not limited to, boehmite, alumina, spinel, alumnosilicate clays (e.g., kaolin, montmorillonite, bentonite, and the like), calcium carbonate, calcium oxide, magnesium oxide, magnesium carbonate, cordierite, spinel, spodumene, steatite, a silicate, a substituted alumino silicate clay or any combination thereof (e.g. kyanite) and the like.

The ceramic can be or contain cordierite, mullite, bauxite, silica, spodumene, clay, silicon oxide, aluminum oxide, sodium oxide, potassium oxide, calcium oxide, zirconium oxide, lithium oxide, iron oxide, spinel, steatite, a silicate, a substituted alumino silicate clay, an inorganic nitride, an inorganic carbide or a non-oxide ceramic or any mixtures thereof. The proppant can include or be one or more sedimentary and/or synthetically produced materials.

Glass-ceramic, as used herein, refers to any glass-ceramic that is formed when glass or a substantially glassy material is annealed at elevated temperature to produce a substantially crystalline material, such as with limited crystallinity or controlled crystallite size. As used herein, limited crystallinity should be understood as crystallinity of from about 5.0% to about 100%, by volume (e.g., 10% to 90%; 20% to 80%; 30% to 70%; 40% to 60% by volume). The crystallite size can be from about 0.01 micrometers to about 20 micrometers, such as about 0.1 micrometers to about 5 micrometers. Preferably the crystallite size is less than 1 micrometer. The glass-ceramic can be composed of aluminum oxide, silicon oxide, boron oxide, potassium oxide, zirconium oxide, magnesium oxide, calcium oxide, lithium oxide, phosphorous oxide, and/or titanium oxide, or any combination thereof.

The glass-ceramic can comprise from about 35% to about 55% by weight $SiO_2$; from about 18% to about 28% by weight $Al_2O_3$; from about 1% to about 15% by weight (e.g., about 1 to about 5 wt %) CaO; from about 7.0% to about 14% by weight MgO; from about 0.5% to about 15% by weight $TiO_2$ (e.g., 0.5 to 5.0 wt %); from about 0.4% to about 3.0% by weight $B_2O_3$, and/or greater than 0.0% by weight and up to about 1.0% by weight $P_2O_5$, all based on the total weight of the glass-ceramic. The glass-ceramic can comprise from about 3.0% to about 5.0% by weight $Li_2O$; from about 0.0% to about 15% by weight $Al_2O_3$; from about 10% to about 45% by weight $SiO_2$; from about 20% to about 50% by weight MgO; from about 0.5% to about 5.0% by weight $TiO_2$; from about 15% to about 30% by weight $B_2O_3$, and/or from about 6.0% to about 20% by weight ZnO, all based on the total weight of the glass-ceramic.

The proppant can comprise aluminum oxide, silicon oxide, titanium oxide, iron oxide, magnesium oxide, calcium oxide, potassium oxide and/or sodium oxide, and/or any combination thereof. The sintered proppant can be or include at least in part cordierite, mullite, bauxite, silica, spodumene, silicon oxide, aluminum oxide, sodium oxide, potassium oxide, calcium oxide, zirconium oxide, lithium oxide, iron oxide, spinel, steatite, a silicate, a substituted alumino silicate clay, an inorganic nitride, an inorganic carbide, a non-oxide ceramic, or any combination thereof.

The glass-ceramic proppant can be fully or nearly fully crystalline or can contain a glass component (e.g., phase(s)) and a crystalline component (e.g., phase(s)) comprising crystallites. The glass-ceramic can have a degree of crystallinity of from about 5.0% to about 100%, or from about 15% to about 80%. For example, the glass-ceramic can have from about 50% to about 80% crystallinity, from about 60% to about 78% crystallinity or from about 70% to about 75% crystallinity by volume. The crystallites can have a random and/or directed orientation. With respect to the orientation of the crystals that are present in the glass-ceramic, the crystal orientation of the crystals in the glass-ceramic can be primarily random or can be primarily directed in a particular orientation(s) (e.g., non-random). For instance, the crystal orientation of the glass-ceramic can be primarily random such that at least 50% or higher of the orientations are random orientations based on the overall orientation of the crystals present. For instance, the random orientation can be at least 60%, at least 70%, at least 80%, at least 90%, such as from about 51% to 99%, from 60% to 90%, from 70% to 95% or higher with respect to the percent of the crystals that are random based on the crystals measured. X-ray diffraction ("XRD") can be used to determine the randomness of the crystallites. As the glass-ceramic can have both crystal and glass components, the glass-ceramic can have certain properties that are the same as glass and/or crystalline ceramics. Thus, the glass-ceramic can provide an ideal gradient interface between the template sphere and the ceramic shell, if present. The glass-ceramic can be impervious to thermal shock. Furthermore, the proportion of the glass and crystalline component of the glass-ceramic can be adjusted to match (e.g., within 10%, within 5.0%, within 1.0%, within 0.5%, within 0.1%) the coefficient of thermal expansion (CTE) of the shell (if present) or other material to which it will be bonded or attached or otherwise in contact with, in order to prevent premature fracture(s) resulting from cyclic stresses due to temperature changes, or thermal fatigue. For example, when the glass-ceramic has from 70% to 78% crystallinity, the two coefficients balance such that the glass-ceramic as a whole has a thermal expansion coefficient mismatch that is very close to zero.

Glass (which can be considered a ceramic type of material), as used herein, can be any inorganic, non-metallic solid non-crystalline material, such as prepared by the action of heat and subsequent cooling. The glass can be any conventional glass such as, for example, soda-lime glass, lead glass, or borosilicate glass. Crystalline ceramic materials, as used herein, can be any inorganic, non-metallic solid crystalline material prepared by the action of heat and subsequent cooling. For example, the crystalline ceramic materials can include, but are not limited to, alumina, zirconia, stabilized zirconia, mullite, zirconia toughened alumina, spinel, aluminosilicates (e.g., mullite, cordierite), perovskite, perchlorate, silicon carbide, silicon nitride, titanium carbide, titanium nitride, aluminum oxide, silicon oxide, zirconium oxide, stabilized zirconium oxide, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or any combination thereof.

The proppant can have a crystalline phase and a glass (or glassy) phase, or amorphous phase. The matrix or amorphous phase can include a silicon-containing oxide (e.g., silica) and/or an aluminum-containing oxide (e.g., alumina), and optionally at least one iron oxide; optionally at least one potassium oxide; optionally at least one calcium oxide; optionally at least one sodium oxide; optionally at least one titanium oxide; and/or optionally at least one magnesium oxide, or any combinations thereof. The matrix or amorphous phase can contain one or more, or all of these optional oxides in various amounts where, preferably, the silicon-containing oxide is the major component by weight in the matrix and/or the amorphous phase, such as where the silicon-containing oxide is present in an amount of at least 50.1% by weight, at least 75% by weight, at least 85% by weight, at least 90% by weight, at least 95% by weight, at least 97% by weight, at least 98% by weight, at least 99% by weight (such as from 75% by weight to 99% by weight, from 90% by weight to 95% by weight, from 90% by weight to 97% by weight) based on the weight of the matrix or based on the weight of the amorphous phase alone. Exemplary oxides that can be present in the amorphous phase include, but are not limited to, $SiO_2$, $Al_2O_3$, $Fe_2O_3$, $Fe_3O_4$, $K_2O$, $CaO$, $Na_2O$, $TiO_2$, and/or $MgO$. For purposes of the present invention, other metals and/or metal oxides can be present in the matrix or amorphous phase. The amorphous phase can include or be ceramic, and for instance can include alumina and/or silica. The amorphous phase can further include unreacted material (e.g., particles), such as alumina, alumina precursor, and/or siliceous material or any combination thereof.

The proppant can include one or more minerals and/or ores, one or more clays, and/or one or more silicates, and/or one or more solid solutions. The minerals or ores can be aluminum-containing minerals or ores and/or silicon-containing minerals or ores. These minerals, ores, clays, silicates, and/or solid solutions can be present as particulates. These component(s) can be present as at least one crystalline particulate phase that can be a non-continuous phase or continuous phase in the material. More specific examples include, but are not limited to, alumina, aluminum hydroxide, bauxite, gibbsite, boehmite or diaspore, ground cenospheres, fly ash, unreacted silica, silicate materials, quartz, feldspar, zeolites, bauxite and/or calcined clays. These components in a combined amount can be present in the material in an amount, for instance, of from 0.001 wt % to 85 wt % or more, such as from about 1.0 wt % to about 80 wt %, from about 5.0 wt % to about 75 wt %, from about 10 wt % to about 70 wt %, from about 15 wt % to about 65 wt %, from about 20 wt % to about 60 wt %, from about 30 wt % to about 70 wt %, from about 40 wt % to about 70 wt %, from about 45 wt % to about 75 wt %, from about 50 wt % to about 70 wt %, from about 0.01 wt % to about 10 wt %, from about 0.1 wt % to about 8.0 wt %, from about 0.5 wt % to about 5.0 wt %, from about 0.75 wt % to about 5.0 wt %, from about 0.5 wt % to about 3.0 wt %, from about 0.5 wt % to about 2.0 wt % based on the weight of the material. These amounts and ranges can alternatively apply to one crystalline particulate phase, such as alumina or an aluminum-containing material. These additional components can be uniformly dispersed throughout the matrix or amorphous phase (like filler is present in a matrix as discrete particulates).

The immobile proppants can be immobilized by microwave sintering. The microwave sintering can include linking two or more proppants together. The microwave sintering can be used to initiate and/or assist and/or increase the speed of the linking of two or more proppants together. For instance, a plurality of proppants can be coated or functionalized or otherwise treated with a chemical group or chemical, such that a reaction can be initiated, assisted, and/or increased (in speed or percent of completion or drive reactivity) by microwave sintering once the proppants are pumped or otherwise placed in their location in the formation.

Figure 3:
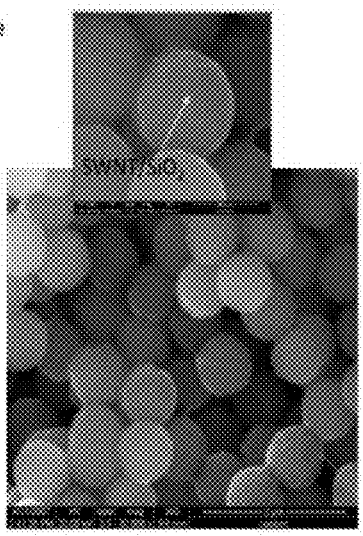
FIG. 3 provides an example of a microwave joining technique for proppants in accordance with the teachings of the present invention.

The microwave sintering can include shaping proppants into twins, triplets, quartets, quintets, sextets, septets, octets, higher-order linked proppants, or any combination thereof. The proppants can be entangled or connected together through in situ sintering, once the proppants are placed into the formation or fracture. For instance, the proppants or a portion thereof can be coated or have carbon nanotubes on the proppant surface, and the nanotubes upon being subjected to microwaves, will become very hot. This will cause proppants that are adjacent to each other to sinter together and form a necking of proppants that are adjacent to each other. This causes the immobilizing of the proppants. Other forms of heating such as infrared radiation can be used instead of or in addition to microwave radiation. The nanotubes can coat the surface of the proppants partially or entirely, for instance, from about 1.0% to about 100% of the exposed surface area of the proppant, or from about 2.0% to about 50% or from about 3.0% to about 35%, or from 5.0% to about 25% of the exposed surface area. The techniques described in the following articles can be applied here: Higginbotham et al., "Carbon Nanotube Composite Curing Through Absorption of Microwave Radiation," Composites Science and Technology, 2008, 68, 3087-3092; and Imholt et al., "Nanotubes in Microwave Fields: Light Emission, Intense Heat, Outgassing, and Reconstruction," Chem. Mater., 2003, 15, 3969-3970, which are incorporated by reference herein in their entireties. FIG. 3 provides example of this microwave joining technique for proppants.

Figure 4:
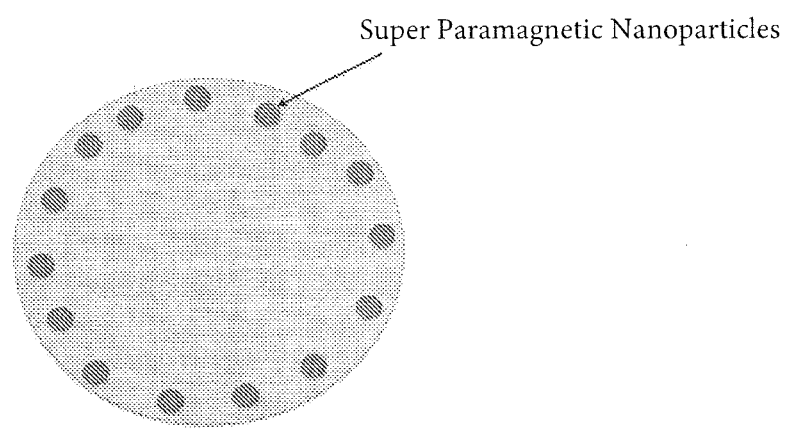
FIG. 4 shows that paramagnetic material, for example, superparamagentic material, can be concentrated near the surface of a proppant in accordance with the teachings of the present invention.

The immobile proppants can be immobilized by ferromagnetism, paramagnetism, superparamagnetism, or any combination thereof. Immobile proppants of the present invention can be or include proppants that can be immobilized by paramagnetizing the proppant pack. For instance, super-paramagnetic material, such as nanoparticles, can be incorporated into the proppant during proppant formation or as a coating on the proppant with paramagnetic material in the coating. The paramagnetic material can be uniformly dispersed throughout the proppant or can be concentrated near the surface, for instance, as shown in FIG. 4. Paramagnetism is a form of magnetism whereby the paramagnetic material is only attracted when in the presence of an externally applied magnetic field. Paramagnetic materials have a relative magnetic permeability greater or equal to unity (i.e., a positive magnetic susceptibility) and hence are attracted to magnetic fields. The magnetic moment induced by the applied field can be linear in the field strength. A sensitive analytical balance to detect the effect and modern measurements on paramagnetic materials can be conducted with a SQUID magnetometer. Paramagnetic materials have a small, positive susceptibility to magnetic fields. These materials are slightly attracted by a magnetic field and the material does not retain the magnetic properties when the external field is removed. Paramagnetic properties are due to the presence of some unpaired electrons, and from the realignment of the electron paths caused by the external magnetic field. Paramagnetic materials include, for example, magnesium, molybdenum, lithium, tantalum, alloys thereof, compounds thereof, any combination thereof, and the like. Ferromagnetic materials include, for example, iron, nickel, cobalt, alloys thereof, compounds thereof, compounds of suitable rare earth metals, any combination thereof, and the like.

The immobile proppants can be immobilized by colloid destabilization in, near, or at the site of a well bore to aggregate the proppants. Immobile proppants of the present invention can be or include proppants that can be immobilized by colloid destabilization. One of the key attributes of an effective proppant system is the ability to adequately keep the proppant particles suspended in the pumping matrix in order to ensure that the particles are optimally transported to all or a sufficient number of points in a fractured substrate. The suspension of the proppant as the dispersed phase in the pumping medium as the dispersion medium is achieved via a variety of methods, including through the formation of gels, sols etc. In a continuous aqueous medium, the state of the colloid can alternate between gel and sol, in a reversible or non-reversible way. In the current invention, a different effect is sought. Specifically, it is the intention to destabilize the colloid near or at the site of the well bore without significant transport into the substrate fracture. This destabilization of the colloid will result in the aggregation and localized hard settling of the proppant particles which is frequently known in the art as flocculation. In this way, an immobile proppant is formed.

There are a number of methods that are known to destabilize colloids that may be effective in the present invention. One method involves the addition of salts to the colloidal suspension. This could be accomplished by introducing the salt solution directly to the colloid to drive flocculation, or it could also be done sequentially with the salt environment first established in the well bore, followed by introduction of the proppant colloid. A second method which could work similarly would be to change the pH of the environment so that the surface charge of the proppant particles in the colloid would be neutralized or blocked, effectively changing the degree of repulsion between the particles and allowing the particles, stripped of their surface charge, to approach each other and fall out of solution as they flocculate.

Yet another method of destabilizing colloidal suspensions is via the addition of one or more flocculating agents. These flocculating agents are frequently charged polymeric materials that can act to collect oppositely charged colloid particles like proppants. For example, in a colloidal suspension of negatively charged silica, the addition of a positively charged polymer can lead to flocculation of the colloidal particles. There are instances where the addition of oppositely charged polymers can be effective as well (described for alumina in Xu, Colloids Surface A.81 (1993) 17-23), incorporated by reference herein in its entirety. The surface charge on the proppant materials (as measured by zeta potential in the medium of choice) can be changed prior to the addition of flocculent to enhance or alter this effect. Certain materials can be added to the colloidal suspension, either directly or sequentially in the well bore, to scavenge any materials that are being utilized to stabilize the colloid. Certain polymers are known to deplete surface active agents in a colloidal suspension. A polymer(s), or graphite or carbon black additions can function in the same way.

The immobile proppants can be immobilized by mechanical entangling or interlocking of the proppants. The immobile proppants of the present invention can be, include, or comprise of proppants which have ability to entangle themselves with adjacent proppants and become locked (temporarily or permanently) into place. The immobile proppants can be entangled with one, two, three, or more proppants adjacent to each other. The entangling of two proppants can be considered twin shaped and the entangling of three proppants can be considered triplet shaped. Higher orders of entangled proppants are also provided by the present invention.

The entangling can be achieved mechanically, physically, chemically, or any combination thereof. The mechanical entangling can be achieved with a plurality of proppants that have one or more shapes that are complimentary to each other, and thus permits their layering to form a semi or fully interlocking connection amongst adjacent proppants. For example, the proppants can have varying shapes or otherwise complimentary shapes that permit their placement next to each other to create a loose fitting puzzle design or a stone wall design, which can still maintain interstices amongst the proppants to permit permeability for fluids, liquid and/or gas, to flow through for recovery. FIG. 1 provides an example of various shapes that can be used to achieve this purpose.

The entangling of proppants can be achieved by fusing two or more proppants together or otherwise attaching two or more proppants together. This fusing or attaching can be accomplished during the manufacturing of the proppant itself, or at any time after the manufacturing of individual proppants, or after placement in the formation or fracture. The fusing can be achieved by forming a peanut shape or other shape while the proppants are in a green state, prior to sintering to form a sintered proppant. This shape can be achieved by extrusion, mold, or by intentionally causing the collision of one or more proppants together, for instance, during a drying state, or tumbling stage, or during spray drying, or through an atomizing step, or processing step.

Figure 5:
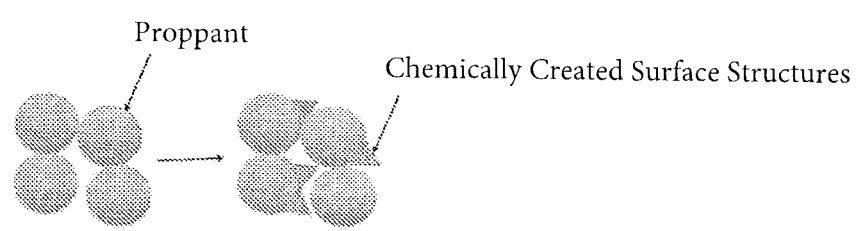
FIG. 5 shows that immobile proppants can include proppants that are immobilized by in-situ dimpling in accordance with the teachings of the present invention.

The immobile proppants can be immobilized by in situ dimpling of the proppants. Immobile proppants of the present invention can be or include proppants that can be immobilized by in-situ dimpling, for instance as shown in FIG. 5. The immobile proppants can be immobilized by surface diffusion. Proppants can be formed that included, at least at the surface or near the surface, a surface diffusing material, like calcium. The proppant can contain or be formed of reacted minerals whose surfaces contain a surface diffusing material, like calcium. A chelating ligand or other surface diffusing promoter can be used to remove the calcium from the proppant surface and redeposit the material (e.g., the surface coating) such that it creates necking of the adjacent particles or otherwise creates a chemically created surface structure (for instance) as shown in FIG. 5. As a further example, calcium and/or other surface diffusing material can be incorporated into the proppant surface and then be exposed to cement retarders or scale inhibitors that react and extract the calcium and/or other surface diffusing material from the proppant surface and then the calcium-containing coating grows on the surface in a re-organized way to form necking or other shapes that will promote necking or interlocking of adjacent proppants, for instance, due to surface forces. This can be a type of surface diffusion or evaporation/condensation type mechanism depending on the materials used to promote the diffusing. The techniques described in the following articles can be adapted here for use in the present invention: Bishop, et al., "A New Mechanism for Cement Hydration Inhibition: Solid-State Chemistry of Calcium Nitrilotris(Methylene)Triphosphonate," Chem. Mater., 2003, 15, 3074-3088; Bishop et al., "Cement Hydration Inhibition with Tartaric Acid, Sucrose and Lignosulfonate: An Analytical and Spectroscopic Study," Ind. Eng. Chem. Res., 2006, 45, 7042-7049; and Lupu et al., "Phosphonate Mediated Surface Reaction and Reorganization: Implications for the Mechanism Controlling Cement Hydration Inhibition," Chem. Commun., 2005, 2354-2356, which are incorporated by reference herein in their entireties.

Immobile proppants of the present invention can be or include proppants that can be immobilized by extrusion techniques. For instance, the proppant can be formed (for instance in the green state), to shapes that permit or promote immobility, such as, but not limited to, tubular shapes. A honeycomb structure is another example. This structure can allow flow of liquids but not of the proppant. The extruded tubes or other shapes can be chopped or otherwise cut into pieces for proppant use and then can be sintered. The tubular or other shaped proppants can be used as-is or can receive any of the additional treatments described herein. For instance, the tubular proppants can have paramagnetic material included, or can have a chemical X on a portion of proppants and a chemical Y on a different portion to promote reaction between the two as described herein.

The proppants of the present invention can be used to prop open subterranean formation fractions. The proppant can be suspended in a liquid phase or other medium to facilitate transporting the proppant down the well to a subterranean formation and placed such as to allow the flow of hydrocarbons out of the formation. The medium chosen for pumping the proppant can be any desired medium capable of transporting the proppant to its desired location including, but not limited to, a gas and/or liquid, energized fluid, foam, like aqueous solutions, such as water, brine solutions, and/or synthetic solutions. Any of the proppants of the present invention can have a crush strength sufficient for serving as a proppant to prop open subterranean formation fractures. For instance, the crush strength can be 1,000 psi or greater, 3,000 psi or greater, greater than 4,000 psi, greater than 9,000 psi, or greater than 12,000 psi. Suitable crush strength ranges can be from about 3,000 psi to about 20,000 psi, or from about 5,000 psi to about 20,000 psi, and the like. In some applications, like coal bed methane recovery, a crush strength below 3,000 psi can be useful, such as from about 500 psi to about 3,000 psi, or from about 1,500 psi to about 2,000 psi.

The proppant can be suspended in a suitable gas, foam, energized fluid, or liquid phase. The carrier material, such as a liquid phase is generally one that permits transport to a location for use, such as a well site or subterranean formation. For instance, the subterranean formation can be one where proppants are used to improve or contribute to the flow of hydrocarbons, natural gas, or other raw materials out of the subterranean formation. The present invention also relates to a well site or subterranean formation containing one or more proppants of the present invention.

The proppants of the present invention can present oil and gas producers with one or more of the following benefits: improved flow rates, improved productive life of wells, improved ability to design hydraulic fractures, and/or reduced environmental impact. The proppants of the present invention also can eliminate or materially reduce the use of permeability destroying polymer gels, and/or reduce pressure drop through the proppant pack, and/or the ability to reduce the amount of water trapped between proppants thereby increasing hydrocarbon "flow area."

Proppants can be made immobile with the use of a coating or substance and/or energy waves emitted from the conduit that the proppants flow through to reach the formation site where immobilized proppants are to be located in the well bore or formation. The coating, substance on the conduit and/or energy waves can be on the internal surface or diameter of the conduit or external surface or diameter of the conduit or both. The conduit can include at least one pipe segment. The proppants can be immobilized by passing through a conduit adapted to cause immobilizing of proppants. The "immobilizing" can be initiated by passing through the conduit such that the actual immobilized proppants are formed or completely immobilized after exiting the conduit. For instance, the conduit can be functionalized with at least one chemical group(s), or chemical(s), wherein the at least one chemical group or chemical is capable of initiating a reaction with proppants that flow through said conduit, such that the proppants become immobilized after exiting the conduit. The conversion to immobilized proppants can start in the conduit or start after exiting the conduit. Generally, the full conversion to form immobilized proppants occurs after exiting the conduit Immobile proppants can be formed by being chemically cross-linked to each other as a result of passing through the conduit Immobile proppants can be formed by passing through the conduit, and microwave sintering occurs, at least partially, in the conduit, wherein the conduit is constructed such that the conduit is capable of providing mirowaves to the proppant flowing through. In lieu of microwaves being emitted in the conduit or by the conduit, other energy waves (IR, UV, laser, temperature, sound waves and the like) can be emitted by the conduit or in the conduit area, such that the proppants become immobile as described herein. The conduit provides an excellent location to cause for this immobilizing to begin or to initiate it or otherwise assist in immobilizing to occur. The conduit can comprise a ceramic coating(s) that is capable of initiating a physical or chemical reaction with proppants that flow through said conduit, such that the proppants become immobilized after exiting the conduit. The ceramic coating can comprise an alumina, a silica, a metal oxide, a mineral, a basalt, or any combination thereof. The conduit can comprise an organic coating(s) that is capable of initiating a physical or chemical reaction with proppants that flow through said conduit, such that the proppants become immobilized after exiting the conduit. The conduit can comprise a polymer coating that is capable of initiating a physical or chemical reaction with proppants that flow through said conduit, such that the proppants become immobilized after exiting the conduit. The conduit can comprise a conversion coating that is capable of initiating a physical or chemical reaction with proppants that flow through said conduit, such that the proppants become immobilized after exiting the conduit. The conversion coating can comprise at least one ceramic, at least one polymer, at least one zinc compound, at least one zincate, at least one phosphate, at least one chromate, or any combination thereof.

As an alternative or in addition, the proppants can be immobilized by passing through a conduit adapted to cause immobilizing of proppants by contacting the outer surface of the conduit with the proppant. The "immobilizing" of the proppant can be initiated by passing through the conduit and then the proppant contacts the outer surface of the conduit such that the actual immobilized proppants are formed or completely immobilized through contact with the outer surface of the conduit. For instance, the outer surface (or portions thereof) of the conduit can be functionalized with at least one chemical group(s), or chemical(s), wherein the at least one chemical group or chemical is capable of initiating a reaction with proppants that contact the conduit, such that the proppants become immobilized next to the conduit. Immobile proppants can be formed by being chemically cross-linked to each other and/or to the conduit as a result of contacting the conduit. Immobile proppants can be formed by emitting microwaves from the conduit to proppants next to the conduit so that microwave sintering occurs, at least partially, wherein the conduit is constructed such that the conduit is capable of providing or emitting mirowaves to the proppant adjacent the conduit. In lieu of microwaves being emitted in the conduit or by the conduit, other energy waves (IR, UV, laser, temperature, sound waves and the like) can be emitted by the conduit or in the conduit area, such that the proppants become immobile as described herein. The conduit provides an excellent location to cause for this immobilizing to begin or to initiate it or otherwise assist in immobilizing to occur. The conduit can comprise a ceramic coating(s) that is capable of initiating a physical or chemical reaction with proppants that flow through said conduit, such that the proppants become immobilized after exiting the conduit. The ceramic coating can comprise an alumina, a silica, a metal oxide, a mineral, a basalt, or any combination thereof. The conduit can comprise an organic coating(s) on the outer surface such that it is capable of initiating or having a physical or chemical reaction with proppants that contact the exterior of the conduit, such that the proppants become immobilized adjacent the conduit. The conduit can comprise a polymer coating that is capable of initiating or having a physical or chemical reaction with proppants that contact the exterior of the conduit, such that the proppants become immobilized adjacent the conduit. The conduit can comprise a conversion coating on the outer surface such that it is capable of initiating a physical or chemical reaction with proppants that is capable of initiating or having a physical or chemical reaction with proppants that contact the exterior of the conduit, such that the proppants become immobilized adjacent the conduit. The conversion coating can comprise at least one ceramic, at least one polymer, at least one zinc compound, at least one zincate, at least one phosphate, at least one chromate, or any combination thereof.

As stated, the conduit can include a ceramic coating. The ceramic coating can include an alumina, a silica, a metal oxide, a mineral, a basalt, any other ceramic described herein, or any combination thereof. The conduit can include an organic coating. The conduit can include a polymer coating on the outer surface and/or inner surface. The conduit can include a conversion coating. The conversion coating can include at least one ceramic, at least one polymer, at least one zinc compound, at least one zincate, at least one phosphate, at least one chromate, or any combination thereof. Zincates can include, for example, a salt containing $Zn(OH)_4^{2-}$ (a a tetrahydroxozincate ion), such as calcium zincate $CaZn(OH)_4.2H_2O$, or $Na_2Zn(OH)_4$, or the salt of a polymeric anion $[Zn(OH)^{3-}]$, such as $NaZn(OH)_3.H_2O$; an alkali solution prepared from dissolving zinc metal, zinc hydroxide, or zinc oxide which contains various anionic species such as $Zn(OH)_4^{2-}$; an oxide containing zinc and a less electronegative element such as $Na_2ZnO_2$; and zinc sulfate. At least one of the conduit and the proppants or immobile proppants can contain a magnetic material. The magnetic material can include a paramagnetic material, a superparamagnetic material, a ferromagnetic material, or any combination thereof. The conduit and/or proppants can contain steel.

The proppants, pre-aggregated proppants, and immobile proppants of the present invention can be used for fracking of a well for hydrocarbon recovery. A method of producing, immobilizing, localizing, or any combination thereof a plurality of proppants is provided by the present invention. The present invention also provides a method of immobilizing proppants including flowing a plurality of proppants into a subterranean location, and fusing the plurality of proppants to each other, to a subterranean surface, or a combination thereof to immobilize the plurality of proppants. The subterranean location can include a fracture, a hydrocarbon-bearing formation, a hole, a well bore, or any combination thereof. The fusing can be accomplished using a chemical reaction, physical interaction, cross-linking, polymerization, microwave sintering, surface diffusion, magnetism, colloid destabilization, mechanical entanglement, interlocking, in-situ dimpling, or any combination thereof. At least a portion of the plurality of proppants can be aggregated prior to flowing into the subterranean location. For example, at least 1.0%, at least 5.0%, at least 10%, at least 25%, at least 40%, at least 40%, at least 50%, at least 60%, at least 75%, at least 80%, at least 90%, at least 95%, or at least 99% of the total proppants by weight or volume can be pre-aggregated. The method can further include extracting at least one hydrocarbon from the subterranean location.

Proppants, pre-aggregated proppants, immobile proppants, or any combination thereof as described herein are provided by the present invention. Methods of producing proppant, pre-aggregated proppants, immobile proppants, or any combination thereof as described herein are also provided by the present invention. Methods of localizing, pre-aggregating, immobilizing, or any combination thereof proppants in a subterranean formation as described herein are further provided by the present invention.

Figure 6:
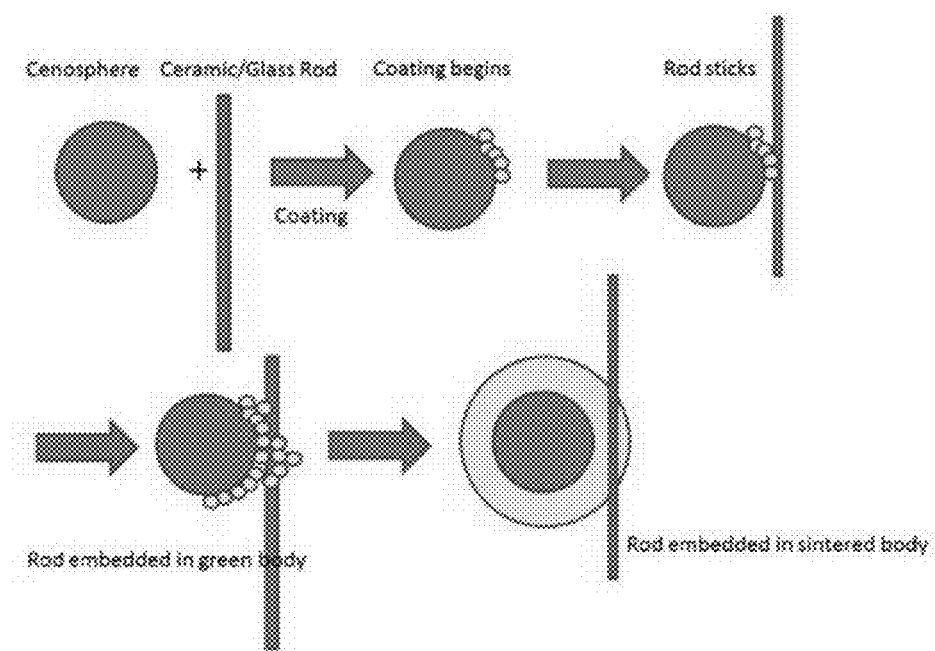
FIG. 6 shows a diagram of the formation of proppants that have the ability to immobilize on use.

The immobile proppants can be a proppant have a template and at least one coating or shell wherein a rod or flake or other interlocking shape is embedded partly into the proppant such as in the coating or shell to create an irregular shaped proppant that can become an immobile plurality of proppants upon being in contact with other proppants of the same or different design. FIG. 6 provides one example of such a design and technique. As shown in FIG. 6, a template such as a cenosphere, can be coated to form a shell. As the coating is being formed, a flake(s) or rod(s) and/or other interlocking shaped material can be introduced so that the flake, rod or interlocking material is partly embedded in the coating, for instance, and then the green body have this interlocking shaped material can be sintered to form a proppant capable of being immobile upon being combined with other proppants of similar design or different design.

The present invention includes the following aspects/embodiments/features in any order and/or in any combination:

1. A plurality of proppants, wherein at least a portion of the proppants are immobile proppants and are immobile in a proppant pack.

2. The plurality of proppants of any preceding or following embodiment/feature/aspect, wherein the immobile proppants are immobilized by chemical reaction between adjacent proppants.

3. The plurality of proppants of any preceding or following embodiment/feature/aspect, wherein the chemical reaction is cross-linking.

4. The plurality of proppants of any preceding or following embodiment/feature/aspect, wherein the immobile proppants are immobilized by microwave sintering.

5. The plurality of proppants of any preceding or following embodiment/feature/aspect, wherein the microwave sintering comprises cross-linking two or more proppants together.

6. The plurality of proppants of any preceding or following embodiment/feature/aspect, wherein the microwave sintering comprises shaping proppants into twins, triplets, quartets, quintets, sextets, septets, octets, higher-order linked proppants, or any combination thereof.

7. The plurality of proppants of any preceding or following embodiment/feature/aspect, wherein the immobile proppants are immobilized by surface diffusion.

8. The plurality of proppants of any preceding or following embodiment/feature/aspect, wherein the immobile proppants are immobilized by ferromagnetism, paramagnetism, superparamagnetism, or any combination thereof.

9. The plurality of proppants of any preceding or following embodiment/feature/aspect, wherein the immobile proppants are immobilized by colloid destabilization near or at the site of a well bore to aggregate the proppants.

10. The plurality of proppants of any preceding or following embodiment/feature/aspect, wherein the immobile proppants are immobilized by mechanical entangling, interlocking of the proppants, or both.

11. The plurality of proppants of any preceding or following embodiment/feature/aspect, wherein the immobile proppants are immobilized by in situ dimpling of the proppants.

12. The plurality of proppants of any preceding or following embodiment/feature/aspect, wherein the immobile proppants are immobilized by passing through a conduit adapted to cause immobilizing of proppants.

13. The plurality of proppants of any preceding or following embodiment/feature/aspect, wherein the conduit comprises at least one pipe segment.

14. The plurality of proppants of any preceding or following embodiment/feature/aspect, wherein the conduit is functionalized with at least one chemical group.

15. The plurality of proppants of any preceding or following embodiment/feature/aspect, wherein the at least one chemical group is capable of initiating a reaction with proppants that flow through said conduit, such that the proppants become immobilized after exiting the conduit.

16. The plurality of proppants of any preceding or following embodiment/feature/aspect, wherein the immobile proppants are chemically cross-linked to each other as a result of passing through the conduit.

17. The plurality of proppants of any preceding or following embodiment/feature/aspect, wherein the immobile proppants are formed by passing through the conduit, and microwave sintering occurs, at least partially, in said conduit, wherein the conduit is constructed such that the conduit is capable of providing mirowaves to the proppant flowing through.

18. The plurality of proppants of any preceding or following embodiment/feature/aspect, wherein the conduit comprises a ceramic coating that is capable of initiating a physical or chemical reaction with proppants that flow through said conduit, such that the proppants become immobilized after exiting the conduit.

19. The plurality of proppants of any preceding or following embodiment/feature/aspect, wherein the ceramic coating comprises an alumina, a silica, a metal oxide, a mineral, a basalt, or any combination thereof.

20. The plurality of proppants of any preceding or following embodiment/feature/aspect, wherein the conduit comprises an organic coating that is capable of initiating a physical or chemical reaction with proppants that flow through said conduit, such that the proppants become immobilized after exiting the conduit.

21. The plurality of proppants of any preceding or following embodiment/feature/aspect, wherein the conduit comprises a polymer coating that is capable of initiating a physical or chemical reaction with proppants that flow through said conduit, such that the proppants become immobilized after exiting the conduit.

22. The plurality of proppants of any preceding or following embodiment/feature/aspect, wherein the conduit comprises a conversion coating that is capable of initiating a physical or chemical reaction with proppants that flow through said conduit, such that the proppants become immobilized after exiting the conduit.

23. The plurality of proppants of any preceding or following embodiment/feature/aspect, wherein the conversion coating comprises at least one ceramic, at least one polymer, at least one zinc compound, at least one zincate, at least one phosphate, at least one chromate, or any combination thereof.

24. The plurality of proppants of any preceding or following embodiment/feature/aspect, wherein at least one of the conduit and the immobile proppants comprises a magnetic material.

25. The plurality of proppants of any preceding or following embodiment/feature/aspect, wherein the magnetic material comprises a paramagnetic material, a superparamagnetic material, a ferromagnetic material, or any combination thereof.

26. The plurality of proppants of any preceding or following embodiment/feature/aspect, wherein the conduit comprises steel.

27. Use of one or more proppants of any preceding or following embodiment/feature/aspect for fracking of a well for hydrocarbon recovery.

28. A method of producing, immobilizing, localizing, or any combination thereof the plurality of proppants of any preceding or following embodiment/feature/aspect.

29. A method of immobilizing proppants comprising:
flowing a plurality of proppants into a subterranean location; and
fusing the plurality of proppants to each other, to a subterranean surface, or a combination thereof to immobilize the plurality of proppants.

30. The method of any preceding or following embodiment/feature/aspect, wherein the subterranean location comprises a fracture, a hydrocarbon-bearing formation, a hole, a well bore, or any combination thereof.

31. The method of any preceding or following embodiment/feature/aspect, wherein the subterranean surface comprises a conduit positioned in a well bore.

32. The method of any preceding or following embodiment/feature/aspect, wherein the fusing is accomplished using a chemical reaction, physical interaction, cross-linking, polymerization, microwave sintering, surface diffusion, magnetism, colloid destabilization, mechanical entanglement, interlocking, in-situ dimpling, or any combination thereof.

33. The method of any preceding or following embodiment/feature/aspect, wherein at least a portion of the plurality of proppants are aggregated prior to flowing into the subterranean location.

34. The method of any preceding or following embodiment/feature/aspect, further comprising extracting at least one hydrocarbon from the subterranean location.

35. Proppants, pre-aggregated proppants, immobile proppants, or any combination thereof as described herein.

36. Methods of producing proppant, pre-aggregated proppants, immobile proppants, or any combination thereof as described herein.

37. Methods of localizing, pre-aggregating, immobilizing, or any combination thereof proppants in a subterranean formation as described herein.

38. Proppants that are operatively associated with an exterior surface of a conduit configured for placement in a well bore, so as to become immobile.

39. The proppants of any preceding or following embodiment/feature/aspect, wherein the conduit comprises at least one pipe segment.

40. The proppants of any preceding or following embodiment/feature/aspect, wherein at least a portion of the exterior of the conduit is functionalized for fusion or reaction or bonding with the proppants.

41. The proppants of any preceding or following embodiment/feature/aspect, wherein at least a portion of the exterior of the conduit is chemically or physically functionalized.

42. The proppants of any preceding or following embodiment/feature/aspect, wherein at least a portion of the proppants are chemically cross-linked to the conduit.

43. The proppants of any preceding or following embodiment/feature/aspect, wherein at least a portion of the proppants are fused to the conduit by microwave sintering.

44. The proppants of any preceding or following embodiment/feature/aspect, wherein at least a portion of the exterior surface of the conduit comprises a ceramic coating.

45. A proppant that is capable of being immobile comprising a spherical proppant having at least one interlocking shaped material attached to the spherical proppant such that the interlocking shape is at least partially exposed on the exterior surface of the spherical proppant.

46. The proppant of any preceding or following embodiment/feature/aspect, wherein said spherical proppant comprises one or more metal oxides or metals or both.

47. The proppant of any preceding or following embodiment/feature/aspect, wherein said spherical proppant comprises a core and shell.

48. The proppant of any preceding or following embodiment/feature/aspect, wherein the interlocking shaped material is embedded partly in the shell.

49. The proppant of any preceding or following embodiment/feature/aspect, wherein said interlocking shaped material is a rod or flake.

50. The proppant of any preceding or following embodiment/feature/aspect, wherein said interlocking shaped material is a non-spherical shaped object.

51. The proppant of any preceding or following embodiment/feature/aspect, wherein said interlocking shaped material is an elongated object.

52. A method of making the proppant of any preceding or following embodiment/feature/aspect, comprising embedding the interlocking shaped material into a green body that forms the proppant while the green body or a part thereof is being formed, and then sintering the green body.

The present invention can include any combination of these various features or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of placing a proppant pack comprising:
introducing a salt solution into a wellbore to establish a salt environment in the wellbore;
thereafter, introducing into the wellbore a colloid solution comprising a plurality of suspended proppants, wherein the proppants comprise a glass-ceramic and a shell, wherein the glass-ceramic has a coefficient of thermal expansion within 10% of a coefficient of thermal expansion of the shell, wherein the glass-ceramic portion of the plurality of proppants comprises crystallites having a random orientation and a degree of crystallinity from about 5.0% to about 100%; and
contacting the colloid solution with the salt solution in the wellbore and allowing the salt solution to destabilize the colloid solution such that at least a portion of the plurality of proppants flocculate and form the proppant pack.

2. The method of claim 1, wherein the immobile proppants are further immobilized by a chemical reaction between adjacent proppants, wherein about 5.0 wt % to about 95 wt % of the immobile proppants are attached.

3. The method of claim 2, wherein the chemical reaction is cross-linking.

4. The method of claim 1, wherein the immobile proppants are further immobilized by microwave sintering.

5. The method of claim 1, wherein the immobile proppants are further immobilized by surface diffusion.

6. The method of claim 4, wherein the microwave sintering comprises shaping proppants into twins, triplets, quartets, quintets, sextets, septets, octets, higher-order linked proppants, or any combination thereof.

7. The method of claim 1, wherein the immobile proppants are further immobilized by ferromagnetism, paramagnetism, superparamagnetism, or any combination thereof.

8. The method of claim 1, wherein the immobile proppants are further immobilized by colloid destabilization near or at the site of a well bore to aggregate the proppants.

9. The method of claim 1, wherein the immobile proppants are further immobilized by mechanical entangling, interlocking of the proppants, or both.

10. The method of claim 1, wherein the immobile proppants are further immobilized by in situ dimpling of the proppants.

11. The method of claim 1, wherein the immobile proppants are further immobilized by passing through a conduit adapted to cause immobilizing of proppants.

12. The method of claim 11, wherein the conduit is functionalized with at least one chemical group.

13. The method of claim 12, wherein the at least one chemical group is capable of initiating a reaction with proppants that flow through said conduit, such that the proppants become immobilized after exiting the conduit.

14. The method of claim 13, wherein the immobile proppants are chemically cross-linked to each other as a result of passing through the conduit.

15. The method of claim 11, wherein the immobile proppants are formed by passing through the conduit, and microwave sintering occurs, at least partially, in said conduit, wherein the conduit is constructed such that the conduit is capable of providing microwaves to the proppant flowing through.

16. The method of claim 11, wherein the conduit comprises a ceramic coating that is capable of initiating a physical or chemical reaction with proppants that flow through said conduit, such that the proppants become immobilized after exiting the conduit.

17. The method of claim 11, wherein the conduit comprises an organic coating that is capable of initiating a physical or chemical reaction with proppants that flow through said conduit, such that the proppants become immobilized after exiting the conduit.

18. The method of claim 11, wherein the conduit comprises a polymer coating that is capable of initiating a physical or chemical reaction with proppants that flow through said conduit, such that the proppants become immobilized after exiting the conduit.

19. The method of claim 11, wherein the conduit comprises a conversion coating that is capable of initiating a physical or chemical reaction with proppants that flow through said conduit, such that the proppants become immobilized after exiting the conduit.

20. The method of claim 19, wherein the conversion coating comprises at least one ceramic, at least one polymer, at least one zinc compound, at least one zincate, at least one phosphate, at least one chromate, or any combination thereof.

21. The method of claim 11, wherein at least one of the conduit and the immobile proppants comprises a magnetic material.

* * * * *